United States Patent [19]

Goldfarb et al.

[11] Patent Number: 4,682,363
[45] Date of Patent: Jul. 21, 1987

[54] AMPHIBIOUS PERSONAL AUDIO SYSTEM

[76] Inventors: Jerry Goldfarb, 30 Brodwood Dr., Stamford, Conn. 06902; Bruce Klenoff, 199 North St., Stamford, Conn. 06901

[21] Appl. No.: 737,009

[22] Filed: May 23, 1985

[51] Int. Cl.$^4$ .......................... H04R 1/10; H04R 1/44
[52] U.S. Cl. ........................................ 381/74; 381/88; 381/187; 381/189; 455/89; 455/90; 455/350; 455/351
[58] Field of Search ........................ 381/74, 87, 88, 90, 381/67, 183, 187, 189; 179/156 R, 156 A, 146 E, 182 R, 184, 179; 367/131, 149; 455/89, 90, 348, 349, 350, 351; D14/36; 379/430

[56] References Cited

U.S. PATENT DOCUMENTS

| | | | |
|---|---|---|---|
| D. 237,508 | 11/1975 | Lung | D14/36 |
| 2,470,687 | 5/1949 | Cafrella et al. | 455/351 |
| 2,538,419 | 1/1951 | Houston et al. | 179/156 R |
| 3,134,861 | 5/1964 | Dempsey et al. | 179/156 R |
| 3,150,346 | 9/1964 | Polly et al. | 364/141 |
| 3,162,813 | 12/1964 | Piccinini | 455/157 |
| 3,218,607 | 11/1965 | Brock et al. | 179/156 R |
| 3,263,032 | 7/1966 | Scanlon | D14/36 |
| 3,268,854 | 8/1966 | Sato | 455/89 |
| 3,306,990 | 2/1967 | Walker | 381/205 |
| 3,391,754 | 7/1968 | Montanaro | 179/184 |
| 3,696,357 | 10/1972 | Kilgore | 179/156 R |
| 3,983,483 | 9/1976 | Pando | 455/89 |
| 3,987,258 | 10/1976 | Tsutsui et al. | 455/350 |
| 4,321,433 | 3/1982 | King | 179/156 R |
| 4,412,106 | 10/1983 | Pavel | 179/156 R |
| 4,456,797 | 6/1984 | Olsen | 179/156 R |
| 4,472,607 | 9/1984 | Houng | 179/182 A |
| 4,562,590 | 12/1985 | DeLage | 381/90 |
| 4,565,258 | 1/1986 | Butler et al. | 179/156 R |
| 4,584,718 | 4/1986 | Fuller | 381/88 |
| 4,588,868 | 5/1986 | Bertagna et al. | 179/182 R |

FOREIGN PATENT DOCUMENTS 478644 6/1929 Fed. Rep. of Germany ...... 179/156

OTHER PUBLICATIONS

Herbert J. Webb, P.E. and Josephine R. Webb, P.E., "An Underwater Audio Communicator", IEEE International Conventional, pp. 133–143, 1966.

Primary Examiner—Gene Z. Rubinson
Assistant Examiner—Danita R. Byrd
Attorney, Agent, or Firm—Blum Kaplan

[57] ABSTRACT

An amphibious personal audio system is provided. The system includes a band for encircling a person's end. An audio device is secured to the band for generating an audio signal. The audio device is hermetically sealed. Speakers are electrically coupled to the audio device for converting the audio signal to an audio sound. The speakers and the electrical coupling are hermetically sealed. Earpiece assemblies are acoustically coupled to the speakers for transmitting the sound to a person's ears. The earpiece assemblies have an opening for transmission of sound to the user's ear canal, the earpiece assembly being adapted to substantially hermetically seal the user's ear canal around the opening.

20 Claims, 6 Drawing Figures

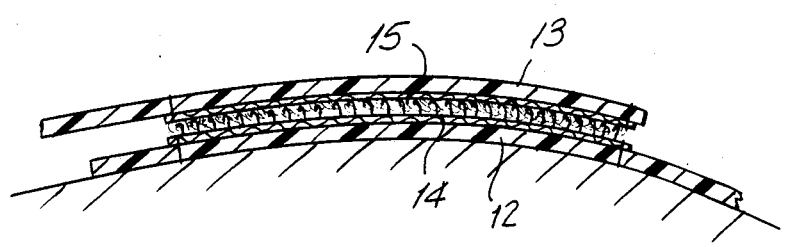
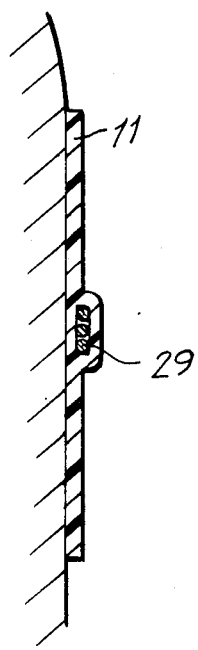
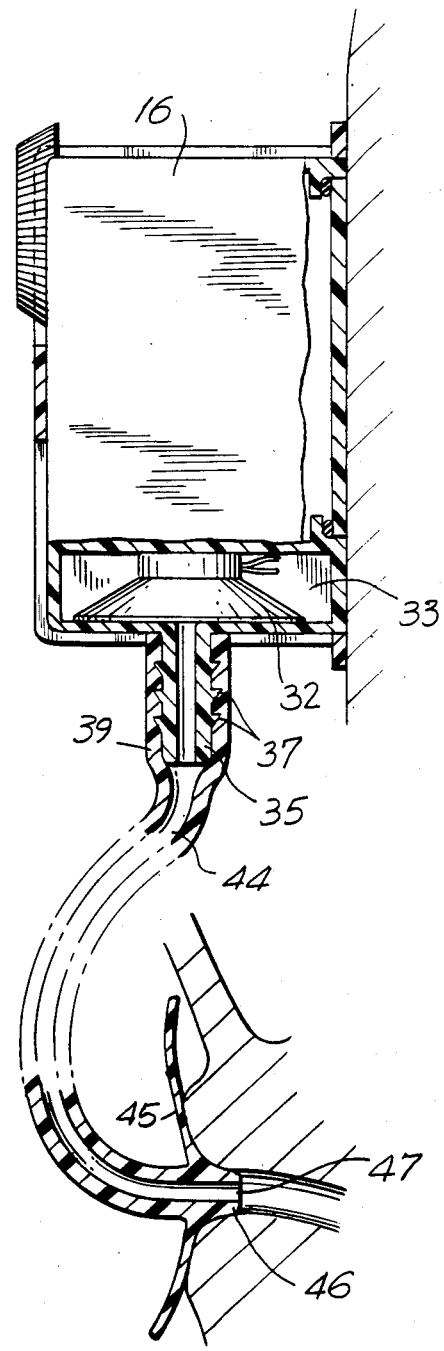

AMPHIBIOUS PERSONAL AUDIO SYSTEM

BACKGROUND OF THE INVENTION

The present invention is generally directed to an amphibious personal audio system and in particular to a personal audio system to be worn about the head when a person is swimming.

In recent years, swimming, in particular swimming laps, has become a popular form of exercise because of the excellent cardio-vascular benefits obtained and the low risk of injury associated with land based exercises such as jogging. However, a large number of swimmers cease swimming after a short period of time due to the boredom associated with swimming. In particular, swimmers tend to have extremely limited visual and aural stimulus while swimming. To obtain the benefits of swimming as an exercise, the swimmer must generally remain in the water for at least fifteen to twenty minutes at each session. As a result, boredom often sets in and people stop swimming as an exercise after a brief period.

Several submersible audio devices have been designed for use in a variety of applications, such as for scuba divers and swimmers. However, these submersible audio systems have tended to be bulky, leaky and interfere with normal swimming motions. Accordingly, there is a need for a submersible personal audio system which is compact, secure against entry of water, and does not interfere with swimming activities.

SUMMARY OF THE INVENTION

The invention is generally directed to an amphibious personal audio system. The system includes a band which encircles a person's head. An audio device is secured to the band and generates an audio signal. The audio device is hermetically sealable. Speakers are electrically coupled to the audio device for converting the audio signal to an audible sound. An earpiece assembly is acoustically and hermetically coupled to the speakers for transmitting the sounds to a person's ears. The earpiece assembly has an opening for transmission of sound to the user's ear canal and the earpiece assembly is adapted to substantially hermetically seal the user's ear canal around the opening. As a result, generally high quality sound is heard by the user even when submerged in water.

Accordingly, it is an object of the instant invention to provide an improved amphibious audio system.

Another object of the invention is to provide an amphibious personal audio system which is capable of providing stereo sound to a swimmer in the water.

A further object of the invention is to provide high quality stereo sound from a radio or cassette player to a swimmer in the water while not interfering with the swimming motion.

Still another object of the invention is to provide a compact and amphibious personal audio system which provides high quality stereo sound to a swimmer in the water from either a radio or cassette source which is contained on a thin band worn by a swimmer.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which;

FIG. 2 is an enlarged cross-sectional view taken along line 2—2 of FIG. 1;

FIG. 3 is an enlarged cross-sectional view taken along line 3—3 of FIG. 1;

FIG. 4 is an enlarged cross-sectional view taken along line 4—4 of FIG. 1;

DETAILED DESCRIPTION OF THE PREFERRED EMBODIMENTS

Figure 1:
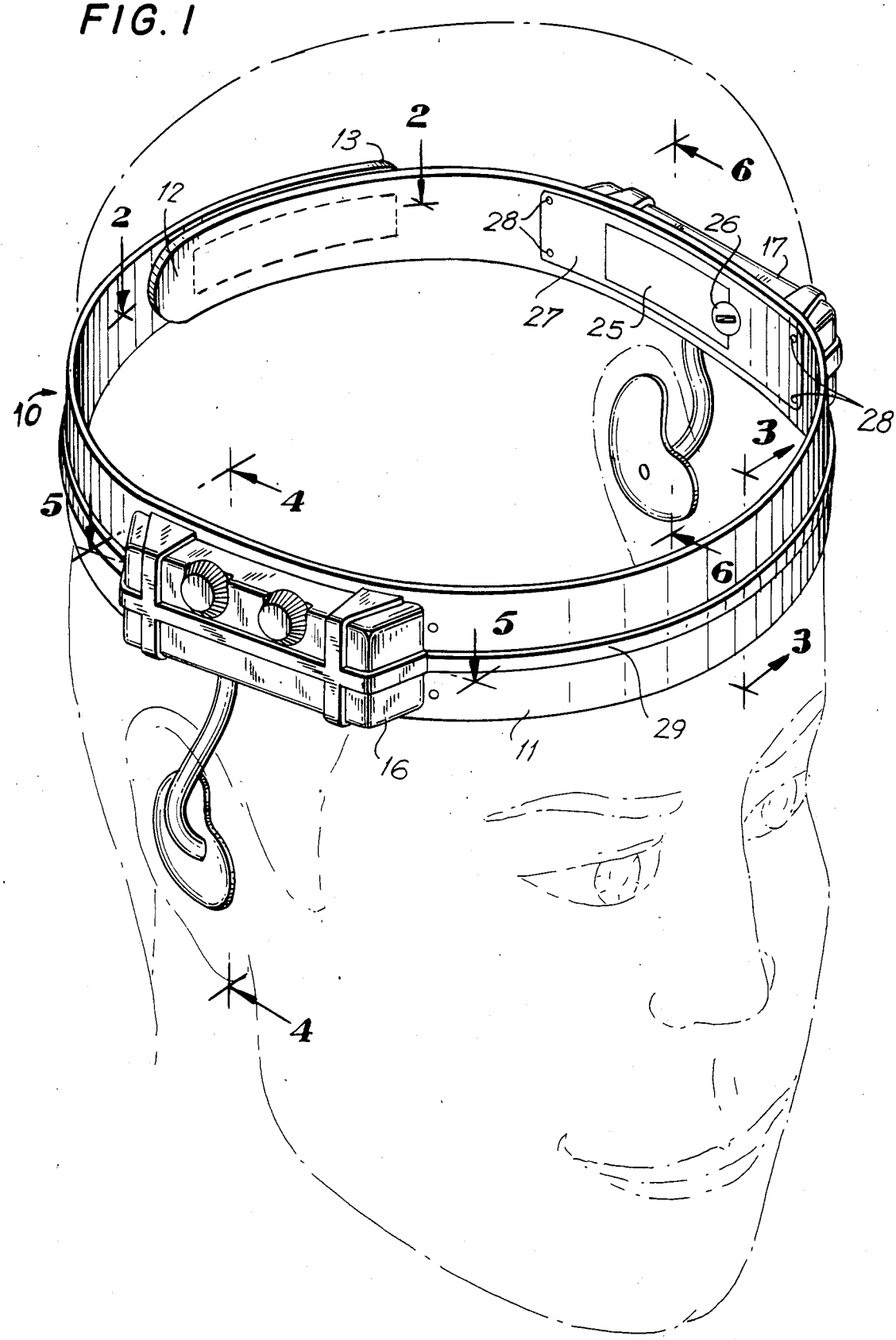
FIG. 1 is a perspective view of an amphibious personal audio system constructed in accordance a preferred embodiment of the invention on a wearer's head.

Reference is made to FIG. 1 wherein a personal audio system, generally indicated as 10, constructed in accordance with a preferred embodiment of the invention is depicted. Personal audio system 10 includes a band 11 with free ends 12 and 13. Free ends 12 and 13 may be coupled to each other in a variety of ways to encircle a wearer's head. In a preferred embodiment, they are connected by VELCRO hook and mesh connectors 14 and 15 (FIG. 2). Personal audio system 10 also has two containers 16, 17 for hemetically sealing the audio components against contact with water.

Band 11 can be formed of a variety of materials which are resistant to contact with water. Band 11 may be made of neoprene rubber or a synthetic material which is capable of bending to follow the shape of the wearer's head. In addition, a small degree of stretching to provide a biasing force which keeps the band on the wearer's head in the water is desirable.

Figure 5:
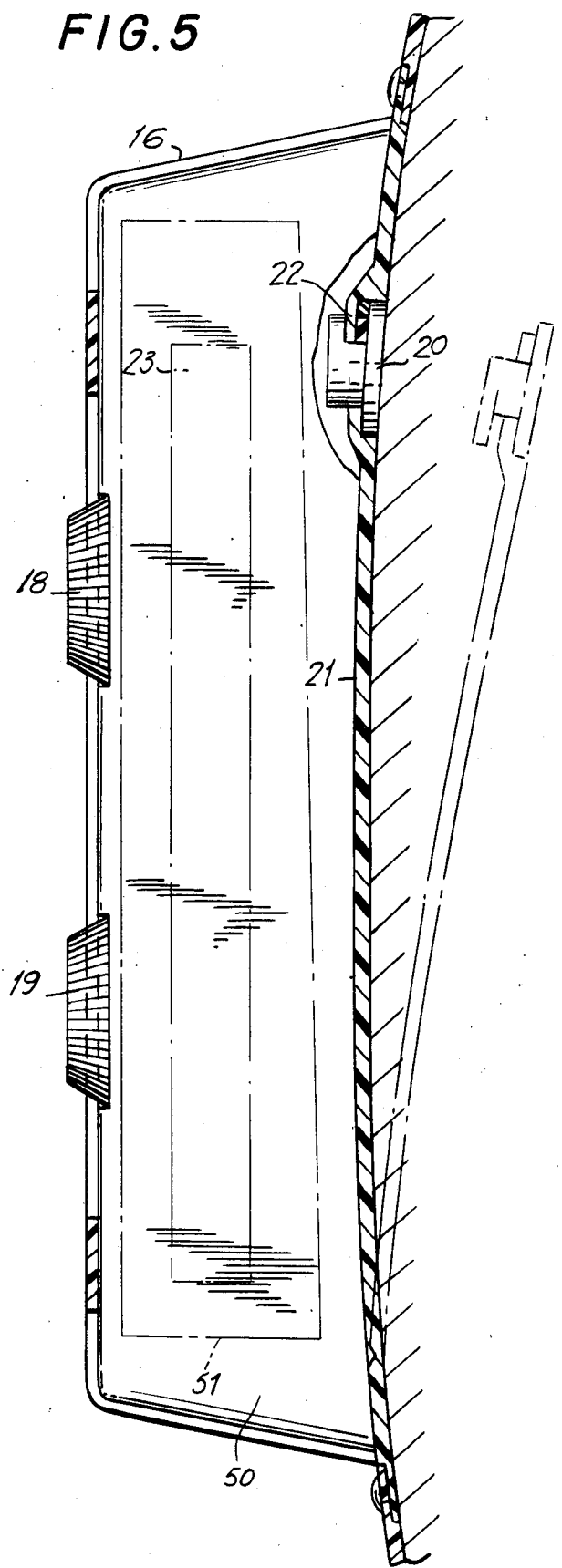
FIG. 5 is an enlarged cross-sectional view taken along line 5—5 of FIG. 1.

Reference is made to FIG. 5 wherein container 16 is shown in greater detail. In a preferred embodiment, container 16 holds a radio receiver 50 and is controlled by knobs 18 and 19 for adjusting volume and tuning the radio. Knobs 18 and 19 are hermetically sealed so as to prevent the entry of water into container 16. The radio receiver may be an AM, FM or AM/FM receiver, for example. With the miniaturization of components developed for land based portable audio devices, very small radio receivers are commerically available. In addition, container 16 has a thumb screw 20 for locking a panel 21 which allows access to the components inside container 16. When thumb screw 20 is locked in place over a projection 22 on the interior surface of container 16, container 16 is hermetically sealed from the interior. A rubber gasket can be inserted to provide a better seal. Thumb screw 20 can have a groove as shown for thumb screw 26 in FIG. 1 or a hemispherical concavity.

In addition, container 16 can contain a cassette player 51 shown in phantom, a cassette 23 being shown in phantom. The cassette player can be either for full sized cassettes or microcassettes. In practice, the use of microcassettes allows for miniaturization of the unit which is preferred.

Figure 6:
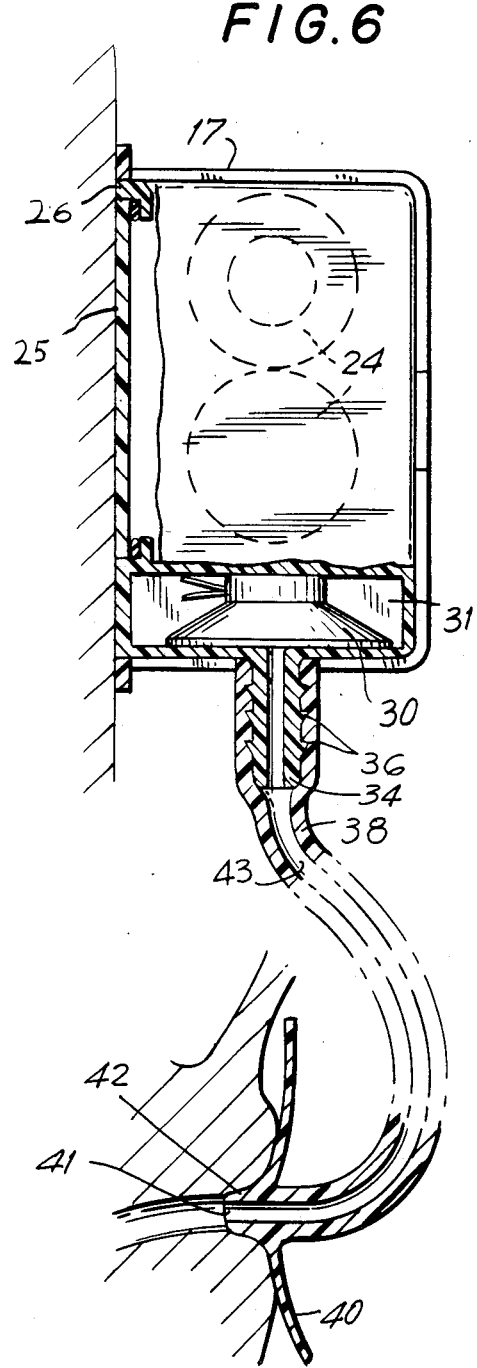
FIG. 6 is an enlarged cross-sectional view taken along line 6—6 of FIG. 1.

Reference is made to FIG. 6 wherein container 17 is shown. Container 17 includes batteries 24 shown in phantom. Other types of batteries or other self-contained electrical storage devices may be used. Container 17 has a panel 25 which is held in place by a thumb screw 26. Panel 25 forms a waterproof seal when held in place by thumb screw 26. However, it is removable so as to allow for the replacement of batteries. Panel 25 opens on the inside of band 11 and as such, contacts the wearer's head 1 when the band is worn. Container 17 is coupled to band 10 by connecting a plate 27 to container 17 through band 11 with connecting rivets 28. Other type of connectors, such as screws or a suitable adhesive may be used. Band 11 has an opening under panel 25 to allow access to container 17. (FIG. 1).

Reference is next made to FIG. 3 wherein a channel 29 formed on band 11 is depicted. Channel 29 is formed to hermetically seal the electrical connections between containers 16 and 17. Channel 29 contains the power connections between batteries 24 and the radio or cassette unit in container 16. In addition, channel 29 contains the wires for transmitting the audio signal from the audio device to a speaker 30 in a compartment 31 of container 17. Band 11 may be configured so as to appear that channel 29 extends about the entire length of band 11 to provide a pleasing appearance. In addition, an antenna may be placed in channel 29 if desired.

Reference is made to FIGS. 4 and 6 wherein the speakers 30 and 32 in container 17 and 16 respectively, are depicted. Speaker 32 is contained in a compartment 33 which serves to improve the quality of the sound produced by the speaker. Speakers 30 and 32 in a preferred embodiment are miniature diaphragm type speakers utilizing a magnetic coil to produce audible sounds. Compartments 31 and 33 have projections 34 and 35, respectively, extending outward from compartments 31 and 33 to provide a means of exit for the sound produced by speakers 30 and 32. The exterior surfaces of projections 34 and 35 have rings 36 and 37 extending outward from projections 34 and 35, respectively. Hoses 38 and 39 slip over projections 34 and 35 and are held in place by the rings 36 and 37. Rings 36 and 37 are adapted to allow movement of the hoses 38 and 39 onto projections 34 and 35 but prevent removal of hoses 38 and 39. As a result of this arrangement hose 38 forms a waterproof seal around projection 34 so that a column of air coupling the air canal of the user and the speaker is created which is substantially impervious to the entry of water or moisture into compartment 31. The entry of water into compartments 31 and 33 would likely damage speakers 30 and 32. Different arrangements to ensure a hermetic seal between hoses 38 and 39 and projections 34 and 35 are possible. However the arrangement shown efficiently seals the connection and is easy to assemble and manufacture.

Hose 38 is formed on the other end with an earpiece 40 having an opening therein 41. Earpiece 40 has a section 42 adapted to fit within the ear canal of a user so as to hermetically seal the ear canal. A waterproof seal is formed around earpiece 40 and in particular section 42 in the wearer's ear canal. Section 42 is configured to fit within the ear canal and prevent moisture from entering the user's ear canal. Known shapes are utilized to develop an earpiece which is adapted to fit within most people's ears.

Reference is made to FIG. 4 wherein the earpiece assembly associated with container 16 is depicted. A similar arrangement, including an air passage 44 and an earpiece 45 with a section 46 and opening 47 to provide a dry column of air between speaker 32 and the user's ear canal is provided. The column of air in air passage 44 allows for the efficient transmission of sound which is severely hampered by the presence of water between the sound source (speaker 32) and the ear. In addition, by ensuring a dry column of air, the speaker need not be designed to operate in a wet environment which would greatly increase the size and cost of the speaker.

If the audio device is a radio receiver, either AM, FM or AM/FM, the audio signal wires in channel 29 act as an antenna. A separate antenna wire can also be included in channel 29 for improved radio reception.

Personal audio system 10 is placed on the wearer's head and free end 13 is pressed against free end 12 causing hook and mesh connectors 14 and 15 to keep the band tightly around the wearer's head. The hook and mesh connectors allow for easy attachment and removal of the band and a secure bond in the water. After the band is attached with containers 16 and 17 above the ears of the wearer, earpieces 40 and 45 are inserted into the ear canals to form a seal. At this point, speakers 30, 32 are coupled to the wearer's ears by columns of air protected from moisture. The radio or tape player is then turned on and the user can begin swimming.

The personal audio system is waterproof unless panels 21 or 25 are opened by rotating thumb screws 20 or 26. Therefore, adjustments can be made to the volume or radio station while in the water.

In the preferred embodiment, as depicted in FIG. 1, containers 16 and 17 have a streamlined appearance which reduces drag in the water, and serves to minimize any interference with the swimming motion.

Accordingly, a compact submersible audio system which provides high quality sound to a swimmer both in and out of the water without interfering with the swimming motion is provided.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An amphibious personal audio system, comprising: band means for encircling a person head's; audio means secured to the band means for generating an audio signal, the audio means being hermetically sealed; speaker means secured to the band means and means electrically coupling to the speaker means to the audio means for converting the audio signal to an audible sound, the speaker means and the electrical coupling means being hermeticaaly sealed; and earpiece means acoustically coupled to the speaker means for transmitting the sound to the person's ears, the earpiece means having an opening for transmission of sound to the user's ear canal, the earpiece means being adapted to substantially hermetically seal around the user's ear canal.

2. The audio system of claim 1 wherein the band means includes a strap having first and second free ends and connector means for releasably securing the first and second ends so as to encircle a person's head.

3. The audio system of claim 2 wherein the strap is formed of a pliable and stretchable material.

4. The audio system of claim 2 wherein the connector means include hook and mesh connectors, the hook connectors being coupled to the first end of the strap and the mesh connectors being coupled to the second end of the strap.

5. The audio system of claim 1 wherein the audio means includes a radio receiver.

6. The audio system of claim 1 wherein the audio means includes a cassette player.

7. The audio system of claim 1 further comprising container means for hermetically sealing the audio means and speaker means.

8. The audio system of claim 7 wherein the container means includes two containers secured to the band means.

9. The audio system of claim 1 wherein the speaker means includes two speakers.

10. The audio system of claim 9 wherein the speakers are miniature diaphragm-type speakers.

11. The audio system of claim 8 wherein the speaker means includes two speakers.

12. The audio system of claim 11 wherein the first container holds the audio means and one of the speakers and the second container holds the second speaker.

13. The audio system of claim 1 further comprising power means for powering the audio means.

14. The audio system of claim 11 further comprising power means for powering the audio means.

15. The audio system of claim 14 wherein the first container holds the audio means and one of the speakers and the second container holds the second speaker and the power means.

16. The audio system of claim 15 wherein the power means includes dry cell batteries.

17. The audio system of claim 1 wherein the earpiece means includes hose means for forming a hermetic seal with the speaker means and ear canal means having an opening therein, coupled to the hose means, the ear canal means being adapted to be received within a person's ear canal so as to substantially hermetically seal the user's ear canal around the opening whereby a column of air is provided between the speaker means and the user's ear through the hose means and the opening.

18. The audio system of claim 12 wherein the earpiece means includes hose means for forming a hermetic seal with the speaker means and ear canal means having an opening therein, coupled to the hose means, the ear canal means being adapted to be received within a person's ear canal so as to substantially hermetically seal the user's ear canal around the opening whereby a column of air is provided between the speaker means and the user's ear through the hose means and the opening.

19. The audio system of claim 17 wherein the earpiece means includes two earpieces having hose means and ear canal means for transmitting sound to the user's left and right ears.

20. The audio system of claim 18 wherein the earpiece means includes two earpieces having hose means and ear canal means for transmitting sound to the user's left and right ears.

* * * * *